United States Patent [19]

Tanigaki et al.

[11] 4,251,711
[45] Feb. 17, 1981

[54] LOW-HYDROGEN COATED ELECTRODE

[75] Inventors: Takashi Tanigaki, Yokohama; Takeshi Koshio, Chigasaki; Motohiro Otawa, Yokohama, all of Japan

[73] Assignee: Nippon Steel Corporation, Tokyo, Japan

[21] Appl. No.: 14,630

[22] Filed: Feb. 23, 1979

[30] Foreign Application Priority Data

Feb. 25, 1978 [JP] Japan .................. 53/20396

[51] Int. Cl.³ .............................. B23K 35/30
[52] U.S. Cl. ....................... 219/146.24; 75/123 B; 219/145.23; 219/146.3; 219/137 WM
[58] Field of Search ......... 219/146.3, 145.23, 146.24, 219/137 WM; 75/123 B, 123 N; 428/366, 385, 386

[56] References Cited

U.S. PATENT DOCUMENTS

| | | | |
|---|---|---|---|
| 3,251,682 | 5/1966 | Wada | 75/123 B X |
| 3,342,974 | 9/1967 | Wallner | 219/146.3 |
| 3,511,701 | 5/1970 | Mouton | 428/385 |
| 3,919,517 | 11/1975 | Ishizaki | 219/146.3 X |
| 4,049,436 | 9/1977 | Scheele | 75/123 B X |
| 4,120,440 | 10/1978 | Kirkwood | 75/123 B X |

FOREIGN PATENT DOCUMENTS

| | | | |
|---|---|---|---|
| 51-20041 | 2/1976 | Japan | 219/145.23 |
| 51-40351 | 4/1976 | Japan | 219/145.23 |

*Primary Examiner*—Richard R. Kucia
*Attorney, Agent, or Firm*—Wenderoth, Lind & Ponack

[57] ABSTRACT

Coated electrode which can produce a weld metal showing good impact toughness and good COD values. This coated electrode comprises a carbon steel and a coating composition comprising 2 to 12% calculated as $TiO_2$ of a titanium oxide, 0.2 to 8% of at least one selected from the group consisting of Ti, Al and Mg, 0.2 to 2% calculated as $B_2O_3$ of a boron oxide or boron oxide compound, 40 to 60% of at least one selected from the group consisting of $CaCO_3$, $MgCO_3$ and $BaCO_3$, 15 to 30% of at least one selected from the group consisting of $CaF_2$, $MgF_2$ and $AlF_3$, 1 to 4.8% Si, 3 to 9% Mn, the balance being a slag forming agent, an arc stabilizing agent and a binder.

3 Claims, 3 Drawing Figures

LOW-HYDROGEN COATED ELECTRODE

BACKGROUND OF THE INVENTION

1. Field of the Invention

The present invention relates to a low-hydrogen coated electrode for arc welding which can produce weld metal having a good COD value (Crack Opening Displacement value).

In recent years, consideration of the COD value has been introduced in inspecting the brittle fracture of metallic materials and its significance has been stressed more and more in welding of offshore structures, low-temperature tanks and the like to be used in cold regions, and a good COD value of the weld metal has become a requisite in these fields in addition to good impact toughness such as expressed in the Charpy value.

Conventionally, for evaluation of the toughness of weld metals, chiefly impact tests, such as the Charpy test, have been applied, and electrodes coated with low-hydrogen compositions mainly composed of calcium carbonate and calcium fluoride, and optionally other elements, such as manganese, nickel, chromium, molybdenum, have been used for obtaining good toughness of the weld metals, and these low-alloy coated electrodes are designed so as to give certain levels of toughness and strength required by specific welded structures.

However, although the conventional low-alloy welding electrodes, for example an electrode containing 1 to 3% Ni, can give good impact toughness in weld metals, such as Charpy impact values, at low temperatures, they definitely fail to give satisfactory COD values in weld metals.

Therefore, strong demands have been made for development of welding electrodes which can produce weld metals having both good impact toughness and good COD values.

2. Summary of the Invention

Therefore, one of the objects of the present invention is to provide a coated electrode which can produce a weld metal showing good impact toughness as well as a good COD value.

The coated electrode according to the present invention comprises a carbon steel core and a coating composition coated on the core, said composition comprising 2 to 12% (as $TiO_2$) of a titanium oxide, 0.2 to 8% of at least one selected from the group consisting of Ti, Al and Mg, 0.2 to 2% (as $B_2O_3$) of a boron oxide or a compound of boron oxide, 40 to 60% of at least one selected from the group consisting of $CaCO_3$, $MgCO_3$ and $BaCO_3$, 15 to 30% of at least one selected from the group consisting of $CaF_2$, $MgF_2$ and $AlF_3$, 1 to 4.8% of Si, 3 to 9% of Mn, the balance being a slag forming agent, an arc stabilizing agent and a binder, and the amount of the coating composition to be coated on the core being 20 to 40% as calculated from the formula of $$\frac{\text{coating}}{\text{core + coating}} \times 100 \text{ (weight \% : coating ratio)}$$

DETAILED DESCRIPTION OF THE INVENTION

The present invention will be described in more detail referring to the attached drawings.

The present inventors have conducted various extensive studies and experiments on coating compositions for the purpose of improving the COD value of weld metals produced by coated electrodes and have found that when appropriate amounts of a titanium oxide, a boron oxide or a compound of boron oxide and at least one of Ti, Al and Mg are contained in the coating composition, Ti and B and their nitrides are uniformly dispersed in solid solution to give a fine uniform grain structure so that the COD value of the resultant weld metal is markedly improved.

The COD value used in the present invention is a value representing resistance against occurrence of the brittle fracture at the top end of a defect of a certain size under a given amount of strain, and a larger COD value represents a larger resistance against the brittle fracture.

Figure 1:
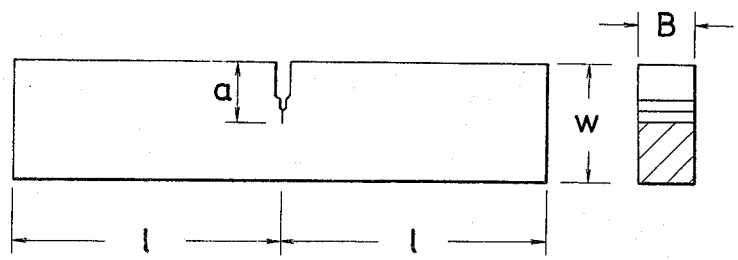
FIG. 1 shows the dimensions of a COD test piece.
Figure 2:
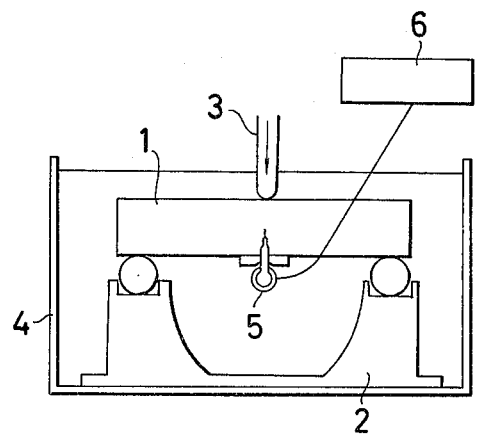
FIG. 2 shows schematically the COD testing method.

For measurement of the COD value, a test piece as shown in FIG. 1, having a notch, with or without the additional fatigue notch, made at the portion of the weld metal to be tested is prepared, and as shown in FIG. 2, this test piece (1) is supported on a bending support (2) and given a static load by a pushing bar (3) so as to effect a three-point bending within a low-temperature test container (4), and the crack opening displacement on the notched surface is measured by a clip gauge (5) and is recorded in a XY recorder (6). This measured value is converted into the crack opening displacement at the tip of the notch, namely the COD value.

Regarding the dimensions of the COD test piece, the following dimensional conditions should be satisfied.

(1) $W = 2B$
(2) $a = 0.5W = B$
(3) $l \geq 2W + 5$ mm in which;
W is the width of the test piece
B is the thickness of the test piece
a is the length of the crack and
l is the half length of the test piece The present inventors prepared coated electrodes for the COD test by coating carbon steel cores (0.06% C, 0.01% Si, 0.48% Mn, 0.012% P, 0.010% S) of 4.0 mm in diameter with various low-hydrogen coating compositions containing 50% of $CaCO_3$, 20% of $CaF_2$, 10% of Fe-Si (Si: 42%), 5% of metallic Mn as basic components and containing various amounts of titanium oxide in the form of $TiO_2$ or titanium in the form of Fe-Ti, or Al-Mg, and B in the form of $Na_2B_4O_7$ together with water glass as a binding agent and baked at 400° C. The coating was done by an ordinary coating machine. Then these coated electrodes were used for welding Al-killed steel plates of 20 mm in thickness with the following conditions:

Groove:          Y groove of 60°

| -continued | |
|---|---|
| Welding position: | Vertical up |
| Current: | 150 A |
| Heat Input: | 40KJ/cm |

Then COD test pieces of the shape as shown in FIG. 1 (B=20 mm, W=40 mm, l=110 mm) were prepared with a fatigue notch at the center portion of weld metals, and were subjected to the COD test at −50° C. by the testing method shown in FIG. 2.

Figure 3:
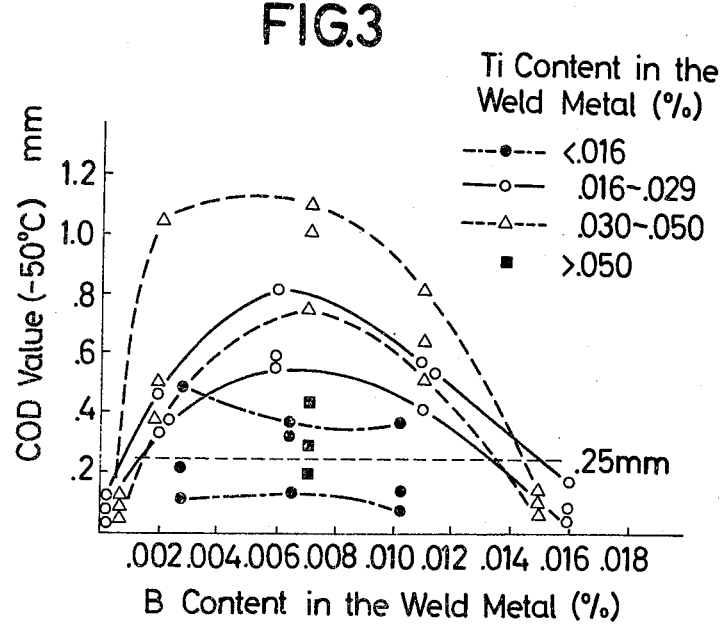
FIG. 3 shows the relation between the COD value at $-50°$ C. between the contents of Ti and B in the weld metal.

The contents of $TiO_2$, Ti, Al, Mg, $B_2O_3$ in the coating compositions used for the test and the contents of Ti and B in the weld metals produced from the above electrodes are shown in Table 1, and the relation between the contents of Ti and B in the resultant weld metals produced from the above electrodes and the COD values of the weld metals are shown in FIG. 3.

According to the results shown in FIG. 3, with 0.016 to 0.05% Ti and 0.002 to 0.014% B in the weld metal, the COD value is 0.25 mm or higher at −50° C., which is a remarkable improvement as compared with the COD value of 0.01 to 0.1 mm at −50° C. of the weld metals obtained by the conventional Si-Mn or 1 to 3% Ni low alloy electrodes.

Thus, the present invention has technical advantages in that the COD value of weld metals can be markedly improved by the appropriate contents of Ti and B and at the same time the welding performance can be greatly improved by the specific coating composition.

Hereinbelow reasons for the limitations of the components of the coating composition according to the present invention will be described.

As the titanium oxide used in the present invention, rutile, ilumenite, titanium slag, etc. may be used, which are reduced into Ti by the addition of one or more of Ti, Al and Mg which are all a strong deoxidizer. Those metals are added to the coating composition for the purpose of stabilizing the welding arc and adjusting the viscosity of slag, and when the amount of the titanium oxide is less than 2% as $TiO_2$, the above desired purposes can not be achieved, while when the amount is in excess of 12%, the viscosity of the slag increases so much that the welding operation with a vertical position becomes difficult. Therefore, in the present invention, the content of the titanium oxide is limited to the range of from 2 to 12%. For obtaining better results, a range of from 2 to 8% is preferable.

Ti is effective to fix nitrogen coming from the exterior as TiN, thus preventing formation of BN in the weld metal. Therefore, Ti is essential for retaining B in solid solution in the weld metal which improves hardenability at the grain boundaries. If no Ti is introduced into the weld metal, BN grows excessively, which causes shortage of the solid solution B so that it is impossible to prevent precipitation of proeutectoid ferrite, resulting in failure to obtain a uniform structure and improved COD values.

Also, Al and Mg are both a strong deoxidizer, and with the addition of these elements in the coating composition, the titanium oxide is reduced to give an appropriate amount of Ti in the weld metal even if Ti itself is not in the coating composition.

Meanwhile additions of one or more of Ti, Al and Mg in amounts less than 0.2% will not produce the desired effect, and on the other hand additions exceeding 8% lower the fluidity of molten slag, resulting in deterioration of the bead shape, unstability of the arc, increased spattering, and deterioration of the detachability of the slag.

Therefore, in the present invention, the addition of one or more of Ti, Al and Mg is limited to the range of from 0.2 to 8%. A preferable range is from 2 to 7%.

The boron oxide or boron oxide compound is added to the coating composition for the purpose of supplying B in the weld metal and improving the COD value of the weld metal in cooperation with Ti in the weld metal. Now the reason for adding B in the form of oxide, such as $B_2O_3$, to the coating composition is that a more uniform and better distribution of B in the weld metal can be achieved by introducing B reduced from the boron oxide or boron oxide compound, such as $B_2O_3$ by the welding arc than that obtained by addition of B from other boron containing materials such as Fe-B, so that a uniform structure of the weld metal can be obtained by addition of a boron oxide or boron oxide compound.

In this case, the boron oxide or boron oxide compound may be admixed under stirring to a binding agent, such as water glass, and thus obtained uniform dispersion or solution may be added to the coating composition.

When the amount of the boron oxide or boron oxide compound in the coating composition is less than 0.2% as $B_2O_3$, the content of B in the resultant weld metal is less than 0.002% which is no more effective to increase the COD value. Substantial improvements of the COD value of the weld metal can be obtained when the amount of the boron oxide or boron oxide compound in the weld metal is in the range of from 0.2 to 2% and when the amount exceeds 2%, the content of B in the resultant weld metal exceeds 0.014% which rather lowers the COD value. A preferable range is 0.7 to 1.7%.

The boron oxide or boron oxide compound used in the present invention means borax, borax anhydride, sassolite, colemanite, kernite and the like.

Carbonates, such as $CaCO_3$, $MgCO_3$ and $BaCO_3$ are decomposed by the welding arc to produce $CO_2$ and protect the arc atmosphere from the surrounding air, and when one or more of these carbonates is less than 40%, unsatisfactory shielding effect results, while when the amount is in excess of 60%, the melting point of the slag is raised, resulting in worsening of the bead shape. Therefore, in the present invention, the amount of these carbonates is limited to the range of from 40 to 60%, more preferably from 50 to 60%.

Regarding the fluorides of metals, such as $CaF_2$, $MgF_2$ and $AlF_3$, when one or more of these fluorides is added in amounts less than 15%, the fluidity of the slag is not satisfactory, and on the other hand, when the addition is made in amounts more than 30%, the arc is not stable. Therefore, in the present invention, the addition of one or more of these fluorides is limited to the range of from 15 to 30%, preferably from 15 to 25%.

In the present invention, Si and Mn are added to the coating composition as a deoxidizing agent or alloying agent. When the addition of Si is less than 1%, enough deoxidation can not be achieved so that blow holes are more likely to occur in the resultant weld metals, but when Si is added in amounts more than 4.8%, an excessive Si content is introduced into the weld metal and this lowers the impact toughness, and hence the COD value of the weld metals. A preferable range of Si is 1.5 to 4.5%.

Meanwhile, when the addition of Mn is less than 3%, enough strength of the weld metal can not be obtained, but when the addition is made in amounts exceeding 9%, the weld metal is more susceptible to crackings at high temperatures. A preferable range of Mn is 4 to 7%.

The above mentioned Ti, Al, Mg, Si and Mn may be added in the elemental form or may be added in the form of ferro-alloy, such as Fe-Ti, Fe-Al, Fe-Si and Fe-Mn, or in the form of alloy, such as Si-Al, Al-Mg, Si-Mn and Ca-Si.

In addition to the above mentioned components, the coating composition according to the present invention contains in an appropriate amount of one or more of a slag forming agent, such as $SiO_2$, $Al_2O_3$, MgO and $Na_3AlF_6$, an arc stabilizing agent, such as $Na_2O$, $K_2O$, $KAlSi_3O_8$, and $NaAlSi_3O_8$, and a binding agent, such as water glass just as in conventional coating compositions.

The coating composition thus prepared is applied by an ordinary coating machine on a carbon steel core wire (for example, JIS G3503, Class 1, No. 1 Steel-C 0.09 max.; Si 0.03 max.; Mn 0.35–0.65; P 0.020 max.; S 0.023 max.; Cu 0.20 max.) in an amount from 20 to 40% by weight as calculated from the formula of $$\frac{\text{coating}}{\text{core} + \text{coating}} \times 100 \text{ (weight \% : coating ratio)}.$$

If the coating is less than 20%, the coating thickness is too thin to form a satisfactory arc cavity and the arc tends to short-circuit, and moreover the absolute amount of the slag is short and gives only insufficient covering. On the other hand, when the coating is more than 40%, the coating thickness becomes so thick that the core wire and the coating are not melted equally; the melting of the core wire preceding the melting of the coating composition, and arc cavity becomes too deep, causing break of the arc, hence prohibiting the welding operation.

As described above, the weld metals produced by the coated electrode according to the present invention provides good impact toughness and a good COD value. However, for improving the strength of the welding metal, appropriate amounts of elements, such as Ni, Cr and Mo may be added to the coating.

The present invention will be better understood from the following embodiments.

Table 2 shows the coating compositions of the coated electrodes according to the present invention and those of comparative coated electrodes, as well as the chemical compositions, the impact property and the COD value of the resultant weld metals. Examples No. 1 to No. 8 are within the scope of the present invention and Examples No. 9 to No. 20 are comparative coated electrodes. In all of the examples and comparisons, a carbon core wire containing 0.06% C, 0.01% Si, 0.48% Mn, 0.012% P and 0.010% S is used, and the coating ratio is 30%.

The electrodes of 4 mm in diameter were used for welding killed steel plates of 25 mm in thickness having a tensile strength of 50 kg/mm² order with X grooves. The welding was done with a flat position at a welding current of 170 A, a heat input of 20 KJ/cm. For testing, three 2 mmV notch Charpy impact test pieces and three COD test pieces (B=25 mm, W=50 mm, l=110 mm, see FIG. 1) were prepared from the weld metals. These impact test pieces and COD test pieces were tested at −50° C.

For evaluation of the impact property and the COD property, when the average absorbed energy of 2 mmV notch Charpy is 15 kg-m or higher at −50° C., the impact property is evaluated as good, and when the lowest COD value at −50° C. is 0.25 or higher, the COD property is evaluated as good.

The weld metals obtained by the coated electrodes No. 1 to No. 8 according to the present invention show 15.7 kg-m or higher Charpy absorbed energy and 0.35 mm or higher COD value, representing satisfactory results.

The weld metals obtained by the comparative coated electrodes No. 9 and No. 10 in which $Na_2B_4O_7$ or $B_2O_3$ is not admixed are low both in the Charpy absorbed energy and the COD value. The weld metals obtained by the coated electrodes No. 11, No. 12 and No. 13 in which Fe-B is added are low both in the Charpy absorbed energy and the COD value irrespective to the amount of Ti and the addition of Al and Mg. From the results of these comparative electrodes, it is clearly understood that it is necessary to add a boron oxide or boron oxide compound to the coating composition as in the present invention so as to improve both the Charpy absorbed energy and the COD value.

The weld metals obtained by the coated electrodes No. 14 and No. 15 in which $Na_2B_4O_7$ or $B_2O_3$ is added, but only 0.1% $B_2O_3$ in No. 14 and 2.7% $B_2O_3$ in No. 15, both being outside the scope of the present invention, are low in both the Charpy absorbed energy and the COD value. The coated electrode No. 16 in which excessive amounts of Ti, Al and Mg are added is confronted by difficulties in the welding operation, such as an unstable arc, much spattering, poor detachability of slag.

The coated electrodes No. 17 and No. 18 are intended to investigate the influence of the amount of $TiO_2$, and it is clear that when 1% $TiO_2$ is added (No. 17) the stability of the arc is deteriorated and when 13% $TiO_2$ is added (No. 18), the increased viscosity of slag hinders the welding operation with a vertical position.

In the case of the coated electrode No. 19, in which an insufficient amount (39%) of carbonate but an excessive amount (34%) of fluoride are added, the coating is quite brittle and the arc is unstable.

In the case of the coated electrode No. 20, in which an excessive amount (61%) of carbonate but an insufficient amount (14%) of fluoride are added, the melting point of slag is high, resulting in deterioration of the bead shape.

As described above, the coated electrode according to the present invention can produce a weld metal having a good impact toughness and at the same time a good COD value at low temperatures, and thus increase the safety of low temperature tanks and other structures.

TABLE 1

| No. | Contents in Coating Compositions % | | | | | Contents in Weld Metal % | |
|---|---|---|---|---|---|---|---|
| | $TiO_2$ | Ti | Al | Mg | $B_2O_3$ | Ti | B |
| 1 | 6 | 0.2 | 0 | 0 | 0 | 0.017 | 0.0002 |
| 2 | 5 | 0.5 | 0.5 | 0 | 0 | 0.032 | 0.0002 |
| 3 | 5 | 0 | 1.5 | 1 | 0.5 | 0.022 | 0.0021 |
| 4 | 8 | 0 | 3.6 | 2.4 | 0.3 | 0.043 | 0.0020 |
| 5 | 4 | 0.1 | 0 | 0 | 0.4 | 0.014 | 0.0027 |
| 6 | 3 | 1.5 | 0 | 0 | 0.7 | 0.024 | 0.0059 |
| 7 | 1 | 0.8 | 0 | 0 | 1.2 | 0.010 | 0.0064 |
| 8 | 14 | 4 | 2.4 | 1.6 | 1.3 | 0.065 | 0.0070 |
| 9 | 10 | 3 | 1.2 | 0.8 | 1.2 | 0.048 | 0.0072 |
| 10 | 1 | 0.4 | 0 | 0 | 1.7 | 0.009 | 0.0102 |
| 11 | 3 | 1 | 0.5 | 0 | 1.4 | 0.019 | 0.0109 |
| 12 | 4 | 2.5 | 2 | 0.8 | 1.4 | 0.046 | 0.0110 |
| 13 | 2 | 0 | 4.8 | 3.2 | 2.5 | 0.046 | 0.0150 |
| 14 | 3 | 1 | 0 | 0.5 | 2.8 | 0.021 | 0.0161 |

TABLE 2

| | No. | TiO$_2$ | FeTiO$_3$ (TiO$_2$) | TiO$_2$-Ti$_2$O$_3$ (TiO$_2$) | Fe-Ti (Ti) | Fe-Al (Al) | Al-Mg (Al,Mg) | Na$_2$B$_4$O$_7$ (B$_2$O$_3$) | B$_2$O$_3$ | Fe-B | CaCO$_3$ | MgCO$_3$ | BaCO$_3$ | CaF$_2$ | MgF$_2$ | AlF$_3$ | Fe-Si (Si) | Mn | Others |
|---|---|---|---|---|---|---|---|---|---|---|---|---|---|---|---|---|---|---|---|
| Present Invention | 1 | — | 4 (2.2) | — | — | — | 8 (4.8,3.2) | 0.3 (.02) | — | — | 42 | — | 2 | 21 | 4 | — | 3 (1.3) | 9 | 6.7 |
| | 2 | — | — | 8 (7.6) | — | — | 6 (3.6,2.4) | 2.9 (2.0) | — | — | 45 | 5 | — | 16 | — | — | 4 (1.7) | 6.5 | 6.6 |
| | 3 | 8 | — | — | 0.5 (0.2) | — | — | 1.5 (1.0) | — | — | 44 | — | 3 | 20 | 2 | 2 | 11 (4.5) | 5 | 6.0 |
| | 4 | — | 9 (4.9) | — | 1 (0.4) | 1 (0.5) | — | — | 1.5 | — | 39 | 3 | — | 20 | 2 | — | 10 (4.2) | 4 | 6.5 |
| | 5 | — | — | 6 (5.7) | 5 (2.1) | 1 (0.5) | 1.5 (0.9,0.6) | — | 0.5 | — | 40 | — | — | 24 | 2 | 3 | 5 (2.1) | 5 | 7.0 |
| | 6 | — | — | 4 (3.8) | 6 (2.5) | 1.5 (0.7) | 2 (1.2,0.8) | — | 1.8 | — | 53 | 3 | 2 | 12 | — | 5 | 3 (1.3) | 3 | 6.7 |
| | 7 | 3 | — | — | 4 (1.6) | — | — | 1 (0.7) | — | — | 50 | — | 5 | 17 | — | — | 8 (3.4) | 3 | 6.0 |
| | 8 | 12 | — | — | 7 (2.9) | — | — | 0.4 (0.3) | 1 | — | 40 | 1 | 2 | 15 | — | — | 7 | 7 | 7.6 |
| Comparisons | 9 | 5 | — | — | 0.5 (0.2) | — | — | — | — | — | 47 | — | 3 | 18 | 2 | 2 | 13 (5.5) | 4 | 7.5 |
| | 10 | 3 | — | — | 4 (1.6) | — | — | — | — | — | 46 | — | — | 20 | — | 2 | 11 (4.6) | 4 | 8.0 |
| | 11 | — | 5 (2.7) | — | 0.4 (0.1) | — | — | — | — | 1 | 47 | — | 3 | 18 | 2 | 2 | 13 (5.5) | 4 | 6.6 |
| | 12 | — | — | 3 (2.9) | 4 (1.6) | — | — | — | — | — | 46 | — | — | 20 | 2 | 2 | 11 (4.6) | 4 | 7.0 |
| | 13 | 2 | — | — | 5 (2.1) | 1 (0.5) | 1.5 (0.9,0.6) | — | — | 2 | 45 | — | 2 | 20 | 2 | 2 | 7 (2.9) | 4 | 6.5 |
| | 14 | — | — | 3 (2.9) | 4 (1.6) | — | — | — | 0.1 | — | 46 | — | — | 20 | 2 | 2 | 11 (4.6) | 4 | 7.9 |
| | 15 | 2 | — | — | 5 (2.1) | 1 (0.5) | 1.5 (0.9,0.6) | 3.9 (2.7) | — | — | 44 | — | 2 | 20 | — | 3 | 7 (2.9) | 4 | 6.6 |
| | 16 | 2 | — | — | 3 (1.2) | 2.5 | 6 (3.6,2.4) | — | — | — | 48 | — | 3 | 18 | — | — | 7 | 4 | 6.5 |
| | 17 | 1 | — | — | 4 (1.6) | — | — | — | — | — | 50 | — | 5 | 18 | — | — | 11 (4.6) | 4 | 7.0 |
| | 18 | 13 | — | — | 2 (0.8) | — | — | — | — | — | 43 | — | — | 19 | — | — | 13 (5.5) | 4 | 6.6 |
| | 19 | 2 | — | — | 2 (0.8) | — | — | — | — | — | 39 | 3 | 5 | 24 | 3 | 7 | 13 (5.5) | 4 | 6.0 |
| | 20 | 2 | — | — | 2 (0.8) | — | — | — | — | — | 53 | — | — | 14 | — | — | 13 (5.5) | 2 | 6.0 |

Remarks:
Figures in ( ) represent percentage of TiO$_2$, Ti, Al, Mg, B$_2$O$_3$ and Si in the coating compositions. Percentage of TiO$_2$ to FeTiO$_3$ is 54%, percentage of TiO$_2$ to TiO$_2$-Ti$_2$O$_3$ is 95%, percentage of Ti to Fe-Ti is 41%, percentage of Al to Fe-Al is 49%, percentages of Al and Mg to Al-Mg are 60% and 40%, percentage of B$_2$O$_3$ to Na$_2$B$_4$O$_7$ is 69%, percentage of Si to Fe-Si is 42%, and percentage of B to Fe-B is 20%.
"—" represents no addition.
"Others" represents slag forming agent, arc stabilizing agent and binder.
*Usability of welding was bad and good weld metal could not be obtained and thus a test piece could not be prepared.

TABLE CONT'D.

|  | No. | Chemical Analysis of Weld Metals % | | | | | | | Charpy vE at −50° C. of Weld Metal kg-m | Lowest Values of three COD Values of Weld Metal at −50° C. mm | Welding Performance | All-round Performance |
| --- | --- | --- | --- | --- | --- | --- | --- | --- | --- | --- | --- | --- |
|  |  | C | Si | Mn | Ti | B | O | N |  |  |  |  |
| Present Invention | 1 | 0.06 | 0.23 | 2.31 | 0.05 | 0.002 | 0.023 | 0.011 | 16.1 | 0.35 |  |  |
|  | 2 | 0.06 | 0.26 | 2.01 | 0.04 | 0.011 | 0.025 | 0.010 | 18.5 | 0.51 |  |  |
|  | 3 | 0.07 | 0.43 | 1.55 | 0.02 | 0.007 | 0.023 | 0.011 | 16.6 | 0.39 |  |  |
|  | 4 | 0.07 | 0.41 | 1.20 | 0.03 | 0.009 | 0.026 | 0.012 | 18.9 | 0.68 |  |  |
|  | 5 | 0.06 | 0.29 | 1.59 | 0.04 | 0.003 | 0.028 | 0.011 | 15.8 | 0.58 |  |  |
|  | 6 | 0.06 | 0.21 | 1.08 | 0.05 | 0.010 | 0.028 | 0.010 | 18.9 | 0.76 |  |  |
|  | 7 | 0.06 | 0.36 | 1.02 | 0.02 | 0.005 | 0.031 | 0.009 | 16.0 | 0.36 |  |  |
|  | 8 | 0.06 | 0.31 | 2.09 | 0.03 | 0.003 | 0.029 | 0.012 | 15.7 | 0.53 |  |  |
| Comparison | 9 | 0.08 | 0.53 | 1.20 | 0.02 | — | 0.024 | 0.010 | 6.1 | 0.02 |  | X |
|  | 10 | 0.07 | 0.47 | 1.26 | 0.02 | — | 0.025 | 0.011 | 8.8 | 0.02 |  | X |
|  | 11 | 0.07 | 0.55 | 1.19 | 0.02 | 0.004 | 0.022 | 0.009 | 11.3 | 0.10 |  | X |
|  | 12 | 0.07 | 0.40 | 1.21 | 0.02 | 0.004 | 0.025 | 0.011 | 10.7 | 0.04 |  | X |
|  | 13 | 0.06 | 0.34 | 1.23 | 0.04 | 0.007 | 0.023 | 0.010 | 8.3 | 0.08 |  | X |
|  | 14 | 0.06 | 0.39 | 1.18 | 0.02 | 0.0009 | 0.024 | 0.009 | 10.0 | 0.18 |  | X |
|  | 15 | 0.06 | 0.35 | 1.20 | 0.04 | 0.015 | 0.026 | 0.010 | 12.8 | 0.09 |  | X |
|  | 16 | 0.06 | 0.38 | 1.26 | 0.05 | — | 0.023 | 0.012 | —* | —* | X | X |
|  | 17 | 0.07 | 0.44 | 1.19 | 0.02 | — | 0.026 | 0.009 | —* | —* | X | X |
|  | 18 | 0.08 | 0.54 | 1.17 | 0.02 | — | 0.024 | 0.011 | —* | —* | X | X |
|  | 19 | 0.07 | 0.53 | 1.17 | 0.02 | — | 0.027 | 0.012 | —* | —* | X | X |
|  | 20 | 0.08 | 0.50 | 1.21 | 0.02 | — | 0.024 | 0.009 | —* | —* | X | X |

What is claimed is:

1. A coated electrode for arc welding comprising a core wire of carbon steel and coating composition coated on the core wire, said coating composition comprising 2 to 12% calculated as $TiO_2$ of a titanium oxide, 0.2 to 8% of at least one selected from the group consisting of Ti, Al and Mg, 0.2 to 2% calculated as $B_2O_3$ of a boron oxide or boron oxide compound, 40 to 60% of at least one selected from the group consisting of $CaCO_3$, $MgCO_3$ and $BaCO_3$, 15 to 30% of at least one selected from the group consisting of $CaF_2$, $MgF_2$ and $AlF_3$, 1 to 4.8% Si, 3 to 9% Mn, the balance being one or more of a slag forming agent, an arc stabilizing agent and a binder.

2. A coated electrode according to claim 1, in which the coating composition is coated on the core wire in an amount of 20 to 40% by weight as calculated from the formula of $$\frac{coating}{core + coating} \times 100.$$

3. A coated electrode according to claim 1, in which the coating composition comprising 2 to 8% calculated as $TiO_2$ of titanium oxide, 2 to 7% of at least one selected from the group consisting of Ti, Al, Mg, 0.7 to 1.7% of a boron oxide or boron oxide compound, 50 to 60% of at least one selected from the group consisting of $CaCO_3$, $MgCO_3$ and $BaCO_3$, 15 to 25% of at least one selected from the group consisting of $CaF_2$, $MgF_2$ and $AlF_3$, 1.5 to 4.5% Si and 4 to 7% of Mn.

* * * * *